Dec. 25, 1934.  P. MURRAY  1,985,739
VEHICLE BODY FOR BARRELS
Filed Aug. 18, 1933  2 Sheets-Sheet 1
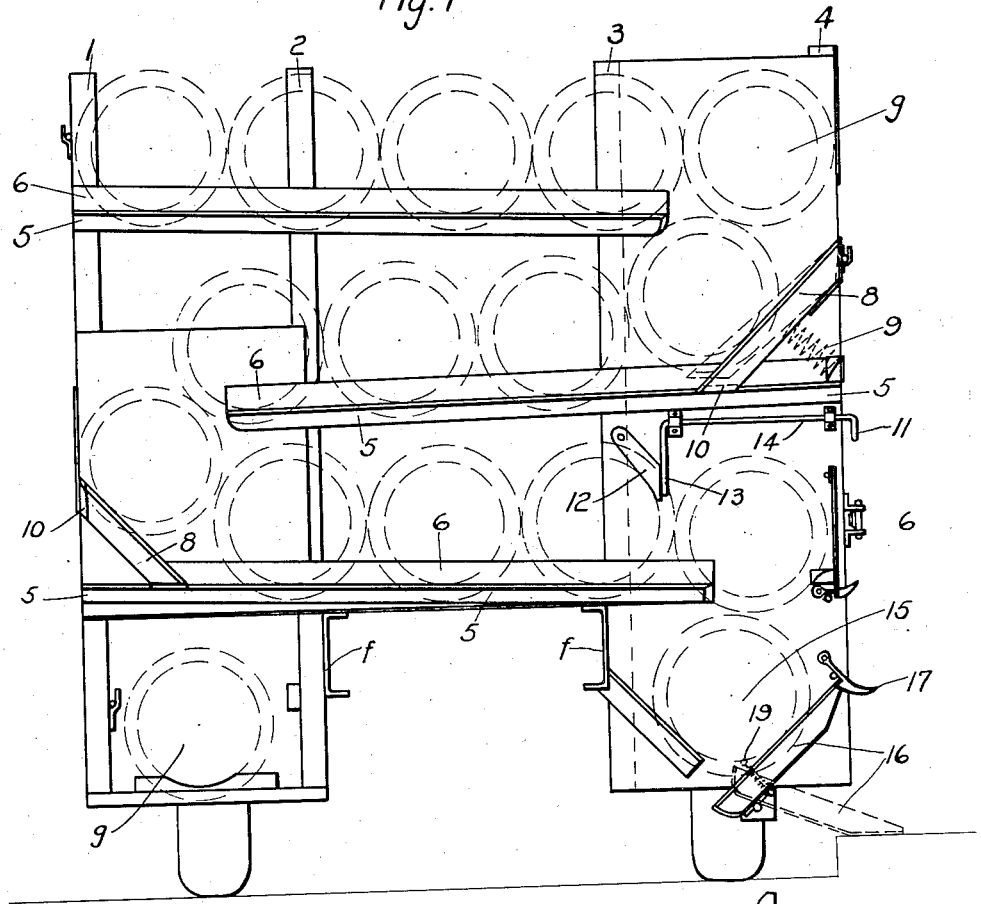
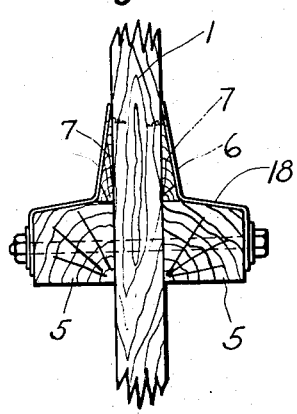
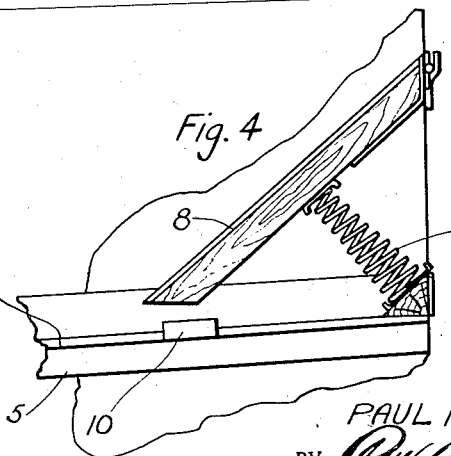
INVENTOR.
PAUL MURRAY
BY 
ATTORNEYS.

Dec. 25, 1934.  P. MURRAY  1,985,739
VEHICLE BODY FOR BARRELS
Filed Aug. 18, 1933  2 Sheets-Sheet 2
Fig. 2
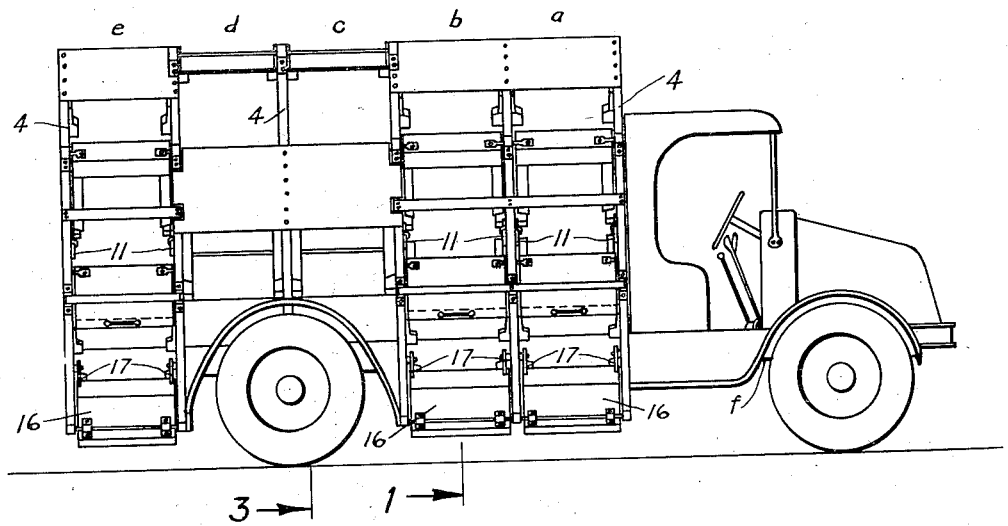
Fig. 3
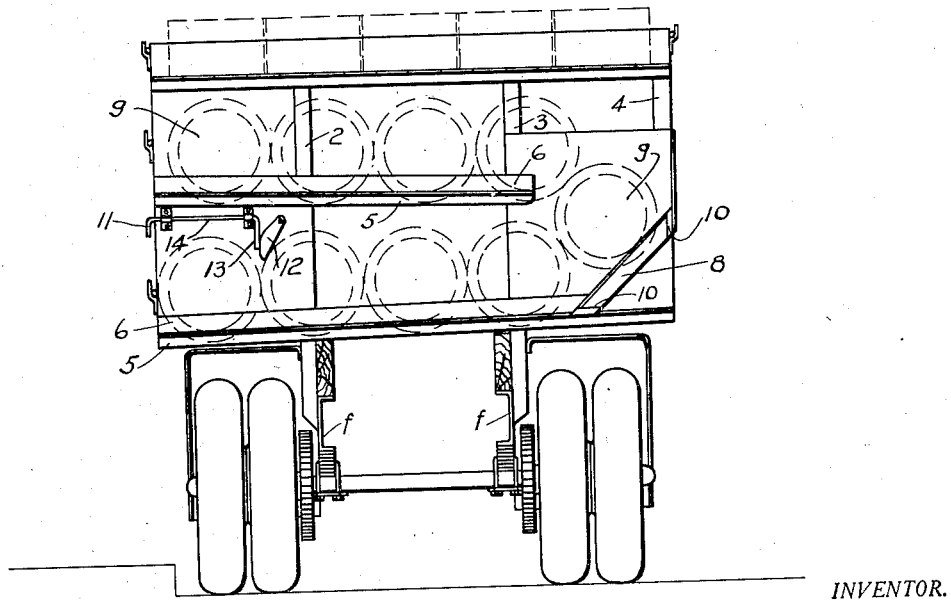
INVENTOR.
PAUL MURRAY
BY 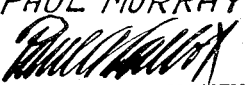
ATTORNEYS.

Patented Dec. 25, 1934

1,985,739

UNITED STATES PATENT OFFICE 1,985,739

VEHICLE BODY FOR BARRELS

Paul Murray, Brooklyn, N. Y.

Application August 18, 1933, Serial No. 685,681

4 Claims. (Cl. 214—83)

My invention relates to vehicle bodies for the transportation of barrels and particularly for the transportation of half barrels of beer.

The objects of my invention are to provide the economical and efficient handling of beer half barrels.

To construct a vehicle body which will automatically deliver half barrels of beer to the sidewalk.

To facilitate the delivery of half barrels of beer and the return of the empty half barrels with the minimum loss in time and labor as well as to reduce the wear and tear and upkeep on the barrels as well as the vehicle body.

I accomplish these and other objects by the construction hereinafter described and illustrated in the accompanying drawings in which:

Figure 1 is a transverse section at 1 Figure 2.

Figure 2 is an elevation of my vehicle body showing its adaptation to the chassis and other parts of the truck.

Figure 3 is a transverse section at 3 Figure 2.

Figure 4 is detail view showing a resilient retarder.

Figure 5 is a fragmentary transverse section of the rails of my invention.

Beer trucks, and the transportation of beer in barrels are and have been responsible for constructions of many types because of the weight of each half barrel of beer.

The usual method of rolling and dropping the barrels is wasteful. The barrels are soon damaged and worn out. The time lost in their handling in direct labor costs as well as the added time the truck is delayed add materially to the cost of deliveries. The various methods of handling and the various constructions of vehicle bodies to facilitate or improve delivery speed and cost need not be detailed here as my invention has many advantages in its application to this important transportation problem as may be seen by the following specification and the description of the operation of my device as hereinafter set forth.

Similar reference characters refer to similar parts throughout the several views of the accompanying drawings.

My invention consists in its preferred form of a number of transverse sections such as (a), (b), (c), (d) and (e) mounted on the chassis (f) of one of any number of well known standard or stock trucks. The number of sections as well as the number of half barrels per section and the application of my invention to other than half barrel delivery trucks may determine the size of the truck used. In some applications of my invention the sections suitable for half barrel delivery may be used in combination with a portion of the body suitable for delivery of bottled beer in cases or other general merchandise. The sections are preferably made in standard dimensions and constructed so that they may be shipped in "knock down" form to be erected at points remote from the factory.

Each of said sections such as (a) comprise the vertical stanchions 1, 2, 3 and 4 held in place by the rails 5 reinforced by the metal shrouding 6. The upper portion of the metal shrouding is stiffened by the chafing strips 7 which with the metal all combine to add strength to said rails and prevent excessive wear from the rolling barrels (g).

By referring to Figures 1 and 3 it may be seen that said rails are inclined from one side of the truck toward the opposite side thus the upper rail 5 may be inclined from the right hand side toward the left side and the rail below from the left side toward the right and the lower rail from the right side toward the left permitting the barrels (g) carried thereon to roll by gravity from the upper rail to the rail below and this system of automatic feeding of the barrels across the truck thus recurs as many times as tiers of rails and barrels thereon may be provided. I do not wish to be limited to the number of tiers as it may prove expedient to increase or decrease the tiers to suit the size of the barrels as well as the size of the truck and body used.

As the barrels drop from each tier to the one below the inclined retarders 8 may be provided with additional resilience such as the spring 9 or rubber shock absorber 10.

The lower tier of barrels in the sections is prevented from feeding by means of the stop lever 11 which I have shown as comprising the swinging member or wearing piece 12 which is normally held in fixed relation to the last barrel in the lower tier by the finger 13 when in its downward position. Said finger is secured to the rotatably mounted shaft 14 which is carried to the side of the truck body where the lever 11, secured to said shaft is provided to raise said finger thereby releasing said wearing piece 12 permitting the barrel held thereby to advance and likewise to permit all of the barrels above to gravitate toward the point of discharge from the truck.

In some of the tiers such as those over the wheels the barrel to be delivered may be dropped on a pad on the sidewalk or it may be desired for long haul and platform delivery to feed the barrels out of the body to the platform from all of the tiers. The platform being in such cases level with or slightly below the rails of the lower tier.

For ordinary delivery to the sidewalk or curb I have provided a pocket 15 having a retractable apron 16 which normally holds a barrel ready for delivery. Said apron 16 is held in its normal position by the latches 17 and by releasing said latches said apron drops to the sidewalk due to the weight of the barrel permitting it to roll out.

Thus it will be seen that one barrel or the entire contents of one section may be released and delivered to the sidewalk as desired.

Experience has shown that the upper surface 18 of the rails 5 must be beveled sloping away from the stanchions and chafing strips 7 to approximately the angle confirming to the shape of the barrel at the ends thereof. Rails having a flat upper surface do not guide the barrels to travel midway between the chafing strips thus increasing the wear both on the ends of the barrels as well as the chafing strips.

By the beveled upper surface as shown by referring to Figure 5 of the accompanying drawings the barrels seldom touch the metal shrouding of the chafing strips permitting the barrels to roll freely with a minimum inclination of the rails and also a minimum of frictional resistance to their progress of automatic travel or rate of feed to the point of delivery. The feed of the barrels automatically is accomplished when the truck is level when the rails are inclined but one-quarter of an inch to the lineal foot along the rails. I do not wish to be limited to this inclination however, nor to the exact construction of the parts of my invention as I may wish to depart therefrom as may prove most expedient for the variation of conditions of operation as well as manufacture and as succinctly set forth in the appended claims.

I have shown a spring 19 for retracting the apron 16 to its normal position. A counterbalance or other means suitable to overcome the weight of the apron may in some constructions serve as well as said spring.

I claim:

1. In a vehicle body, sections comprising rails adapted to support and deliver barrels to the side of said vehicle, and tapered chafing strips above said rails, and a metal shrouding covering said chafing strip as well as the upper and side surfaces of said rails, thereby increasing the strength and durability of said sections for a given weight.

2. In a vehicle body, tiers of inclined rails transversely arranged to feed barrels alternately from one side of said body to its opposite side to a point of delivery from the lower-most tier, a pocket at the end of said lower-most tier containing a single barrel and a pivoted apron depressed to the sidewalk by the weight of said barrel, said apron forming the bottom of said pocket.

3. In a vehicle body, a plurality of transverse sections of rails in tiers arranged to feed barrels by gravity, pockets having swingingly mounted aprons forming the bottoms thereof to feed barrels from said body to the sidewalk at the side of said vehicle.

4. In a vehicle body, tiers of inclined rails transversely arranged to feed barrels alternately from one side of said body to its opposite side to a point of delivery from the lower-most tier, an apron depressed to the sidewalk by the weight of said barrels and means for returning said apron to its normal position.

PAUL MURRAY.